United States Patent Office 3,473,283
Patented Oct. 21, 1969

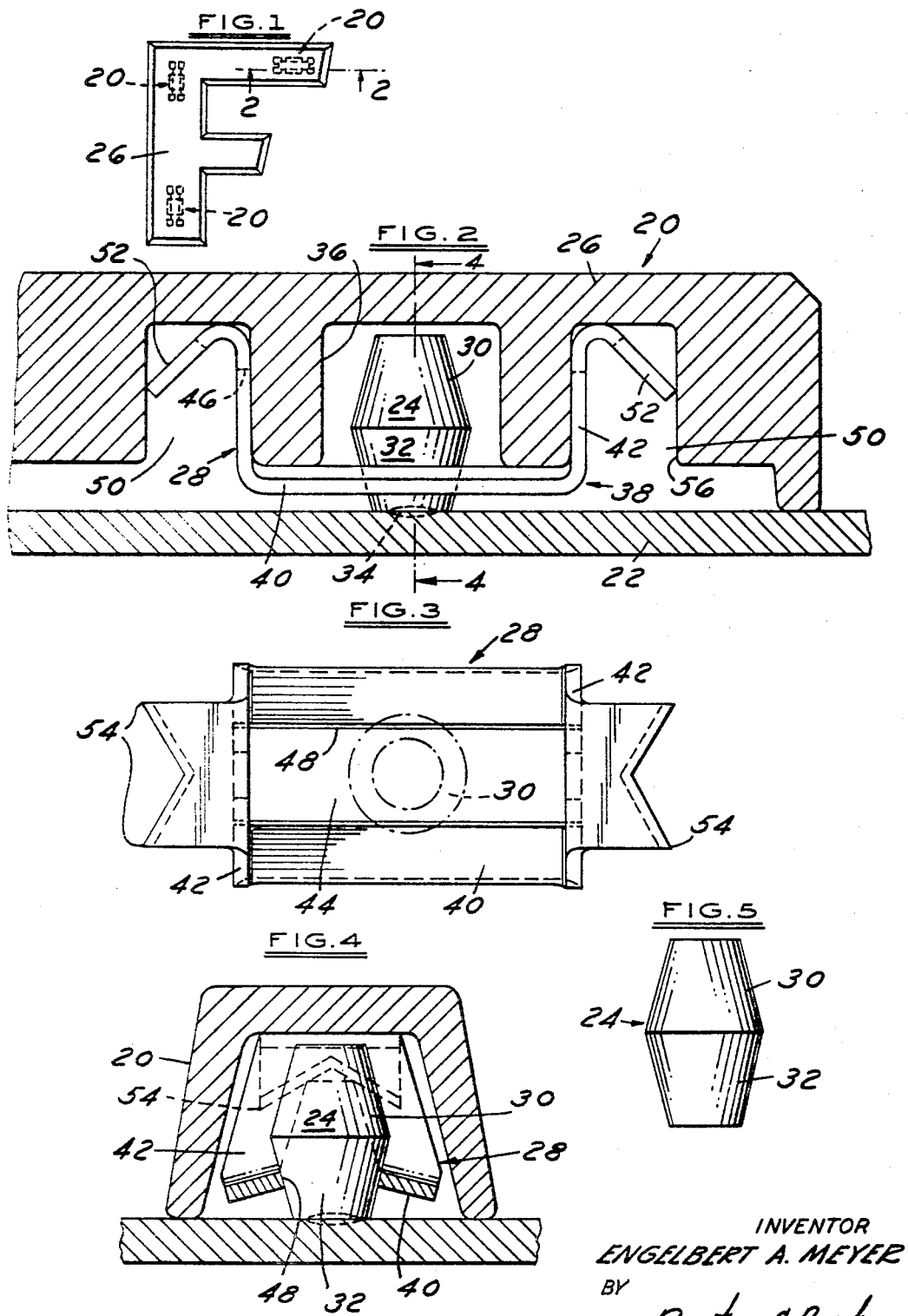

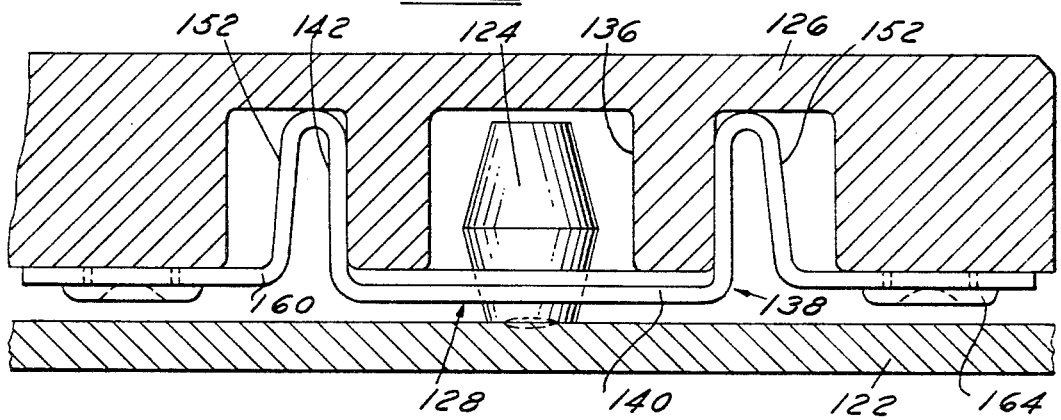
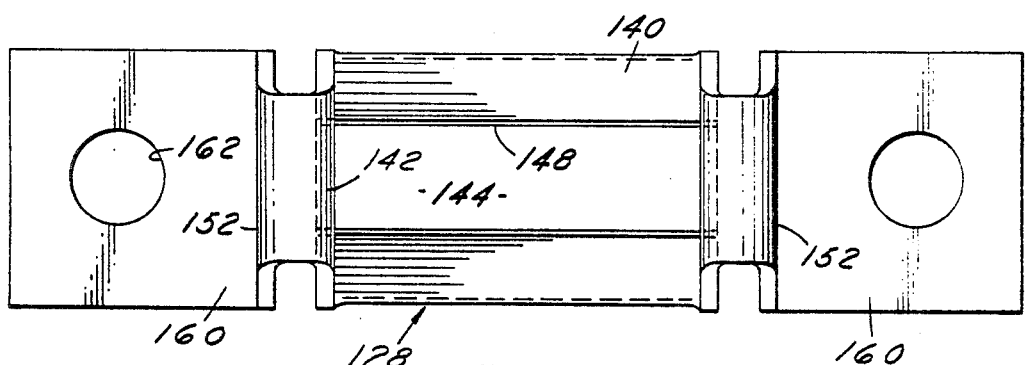
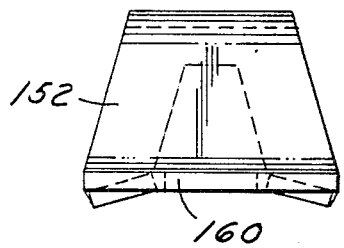

3,473,283
STRUCTURAL ASSEMBLY AND CLIP
Engelbert A. Meyer, Union Lake, Mich., assignor to Warren Fastener Corporation, Mount Clemens, Mich., a corporation of Michigan
Filed Jan. 25, 1968, Ser. No. 700,407
Int. Cl. A44b 21/00; F16b 19/00
U.S. Cl. 52—718          12 Claims

ABSTRACT OF THE DISCLOSURE

This disclosure relates to a structural assembly including a support having a button secured thereto, a hollow structural member overlying the support and the button, and a clip interconnecting the structural member to the support. The clip has a U-shaped portion defining a button receiving slot extending longitudinally through the bite portion into the upwardly extending arms of the U-shaped portion, to permit the gripping edges adjacent the slot to resiliently spread to receive the button and grip the button head, and downwardly extending distal ends of the U-shaped portion which are secured to the structural member.

FIELD OF THE INVENTION

This invention relates to a structural assembly including a clip attaching the hollow structural member of the assembly to a support.

DESCRIPTION OF THE PRIOR ART

Relatively small metal castings, such as an automotive name plate, are presently attached to the panel of an automotive body by providing integral projecting "pins" on the casting, which are received through the panel, and are secured thereto by a clip or blind fastener on the opposite side of the panel. The structural assembly of my invention is intended to eliminate the requirement of an aperture through the panel or support by utilizing the weld on fastener system disclosed in the United States Patent 3,153,468 to Sweeney. In the method of securing a structural member to a support disclosed in the reference Sweeney patent, a button or buttons are welded to steel or adhesively secured to various materials including steel, thereby eliminating the corrosion problems inherent in previously used techniques requiring an aperture through the support. A suitable size button, presently used in the securement of automotive trim or the like, involves a button which is 0.200 inch in diameter at its head, and 0.160 inch in height. Utilization of this new concept in the attachment of automotive trim has provided substantial economies and advantages over previously used methods. Similar advantages can be obtained in other fields, such as home appliances or the like.

SUMMARY OF THE INVENTION

The structural assembly of my invention includes a support having a button secured thereto, a hollow structural member received over the support and the button, and a resilient clip interconnecting the structural member to the button. The clip has an upwardly opening U-shaped portion defining a button receiving slot extending longitudinally through the bite portion of the U-shaped portion, and into the upwardly extending arms, to provide opposed gripping edges in the bite portion adapted to resiliently spread to receive the button head therethrough. After receiving the button, the gripping edges bite into the head portion of the button to retain the clip on the button. The distal ends of the U-shaped portion extend toward the support, and are secured to the structural member. In the preferred embodiment of the clip of my invention, the bite portion is canted upwardly toward the axis of the slot, adjacent the slot, to define the above referenced gripping edges, and the slot extends to adjacent the upper end of the arms to aid in the resilient spreading of the gripping edges. The gripping edges are preferably parallel to permit longitudinal adjustment of the clip on the button head. The button head is provided with an upwardly facing conoidal camming surface which spreads the gripping edges during attachment.

In the preferred embodiment of the structural assembly of my invention, the hollow structural member is provided with slots which receive the upwardly extending arms of the clip, and the distal ends of the U-shaped portion are defined at an acute angle to the arms to be wedgingly received in the structural member slots. The ends of the clip may be V-shaped to provide biting ends which grip the opposed walls of the structural member slots. In the other disclosed embodiment of my invention, the distal ends of the U-shaped portion extend beneath the structural member to be secured thereto by spinning or staking.

BRIEF DESCRIPTION OF THE DRAWINGS

FIGURE 1 is a top view of a nameplate secured by the structural assembly of my invention;

FIGURE 2 is a partial cross sectional view of the structural assembly shown in FIGURE 1, in the direction of view arrows 2—2;

FIGURE 3 is a top view of the clip utilized in the structural assembly of FIGURE 2;

FIGURE 4 is an end cross sectional view of the structural assembly shown in FIGURE 2, in the direction of view arrows 4—4;

FIGURE 5 is a side view of the button utilized in the structural assembly of FIGURE 2;

FIGURE 6 is a side cross sectional view, similar to FIGURE 2, of another embodiment of the structural assembly of my invention;

FIGURE 7 is a top view of the clip utilized in the assembly of FIGURE 6; and

FIGURE 8 is an end view of the clip shown in FIGURE 7.

DESCRIPTION OF THE PREFERRED EMBODIMENTS

FIGURE 1 illustrates the structural assembly of my assembly utilized to secure the character F of a nameplate or the like, such as might be used on an automobile or appliance. The character is secured by three clip assemblies 20, which are shown in more detail in FIGURES 2 to 5. The assembly includes a support 22 having a button 24 secured thereto, a structural member 26 which in this embodiment is the character F shown in FIGURE 1, and a resilient sheet metal clip 28 interconnecting the structural member to the button.

The button of this embodiment of my invention includes an upwardly facing conoidal camming surface 30, and surface 32 overlying the support adapted to retain the clip 28 on the button. The button is preferably symmetrical, as shown in FIGURE 5, to aid in feeding the button to the welding apparatus. The button is preferably welded to the support, as shown at 34, or adhesively bonded without perforation of the panel as described in the above referenced United States Patent to Sweeney. The button is received in a slot 36 defined in the underside of the structural member 26.

The clip 28 of this embodiment includes an upwardly opening U-shaped portion 38 having a bite portion 40 and opposed upwardly extending arms 42. The U-shaped portion includes a longitudinal slot 44 which extends upwardly into the arms 42, to adjacent the upper end of the arms at 46, to permit the gripping edges 48 of the button portion to resiliently spread to receive the button head 30, shown in phantom in FIGURE 3. The gripping edges 48 are preferably parallel to allow longitudinal adjustment of the clip on the button. As shown in FIGURE 4, the bite portion 40 adjacent the slot is canted toward the axis of the slot to provide gripping edges 48 which bite into the downwardly facing surface 32 of the button to securely retain the clip on the button. Further, the gripping edges of the clip will tend to bite deeper into the button if the structural member is forced away from the support, because of the cantilaver action provided by the U-shaped portion.

In this embodiment of the assembly, the structural member is provided with slots 50 which receive the upwardly extending arms 42 of the U-shaped portion of the clip, and the distal ends 52 of the clip extend downwardly at an acute angle to the arms to be wedgingly received in the slots 50. The ends of the clip are generally V-shaped, as shown in FIGURE 3, to provide two gripping ends 54 which bite into the opposed wall 56 of the slots, and retain the structural member on the clip.

The character "F" shown in FIGURE 1 is assembled on the support by forcing the arms 46 of the clip into the slots 50 in the structural member. The distal ends 52 of the U-shaped portion are thereby wedged into the slots 50, and the gripping ends 54 prevent withdrawal of the clip from the structural member. The clips are then aligned with the buttons 24 previously secured to the support, and the structural member is forced toward the support to seat the buttons in the slot 44 defined in the clips. The conoidal camming surface 30 of the buttons will resiliently expand the slots to receive the buttons, and the gripping edges 48 prevent removal of the clip. If a button or clip is damaged, the damaged element may be replaced without requirement of replacement of the structural member, which is an important advantage of the structural assembly of this embodiment.

The embodiment of the structural assembly shown in FIGURES 6 to 8 includes a support 122 having a button 124 secured thereto, a structural member 126, and a resilient sheet metal clip 128 interconnecting the structural member to the button. The support and the button may be idenitcal to the embodiment disclosed in FIGURES 2 to 5 and have been numbered accordingly. The clip of this embodiment also includes a U-shaped portion 138 having a slotted bite portion 140 and a pair of opposed upwardly extending arms 142. The bite portion 140 adjacent the slot 144 is canted upwardly toward the axis of the slot, as described above, to provide biting edge 148 which grip the head portion of the button.

The distal ends 152 of the U-shaped portion of the clip extend downwardly to be received beneath the structural member, to be secured thereto. The distal ends of the clip 160 extend longitudinally from the distal ends 152 of the U-shaped portion, and include apertures 162 which receive rivets 164 integral with the structural member 126. The rivets may then be spun or staked in place as shown in FIGURE 6. The structural assembly of FIGURES 6 to 8 thus provides a permanent securement between the clip 128 and the structural member which may be preferred in certain applications. The details of the structural assembly which are not fully described may be considered identical to the structure described in relation to FIGURES 2 to 5.

While various materials may be utilized for the elements of the structural assembly and clip of my invention, the automotive industry utilizes steel primarily for the support panel, and stainless steel or cold-rolled zinc plated steel for the button. The structural member may be formed from any suitable material, however small structural elements, such as automotive nameplates, are generally cast from steel or aluminum. The structural member may however be formed of plastic. The clip is preferably formed from a resilient sheet material, especially the embodiment of FIGURES 2 to 4, such as 1050 steel having a Rockwell hardness of 44 to 47.

It will be understood by those skilled in the art that various modifications may be made to the embodiments of my invention disclosed herein. For example, a different form of button may be utilized, including the various buttons disclosed in the development of the weld on fastener system. Further, the clip disclosed in FIGURES 6 to 8 may be secured to the structural member 126 in any suitable manner.

What is claimed is:

1. A clip for attaching a hollow structural member to a support having a stud secured thereto, said stud having a head portion spaced from the plane of the support, comprising: an upwardly opening U-shaped portion having a central bite portion and opposed upwardly extending arms, a slot extending longitudinally through the bite portion and into the upwardly extending arms defining opposed segments, said bite portion segments canted upwardly at an angle toward the axis of the slot adjacent the slot to define gripping edges adapted to resiliently spread to receive the button and grippingly engage the head portion of the button, and the distal ends of said U-shaped portion extending downwardly to be secured to the hollow structural member.

2. The clip defined in claim 1, characterized in that said downwardly extending distal ends of the U-shaped portion extend at an acute angle to said arms and include gripping ends adapted to be wedged in gripping engagement with the opposed slots in the structural member.

3. The clip defined in claim 2, characterized in that said gripping ends are generally V-shaped to include two spaced pointed edges adapted to grip the walls of the slots in the structural member.

4. The clip defined in claim 1, characterized in that said downwardly extending ends include a longitudinally extending end portion adapted to be secured to the underside of the structural member.

5. The clip defined in claim 1, characterized in that said slot extends to adjacent the upper end of said arms to permit resilient spreading of said gripping edges of the bite portion.

6. The clip defined in claim 5, characterized in that said gripping edges are substantially parallel to permit longitudinal adjustment of the clip on the button.

7. A structural assembly, comprising: a support having a button secured thereto, said button having a head portion spaced from the plane of the support, a hollow structural member received over the button, and a resilient clip interconnecting the structural member to said button, said clip having an upwardly opening U-shaped portion having a central bite portion and opposed upwardly extending arms, a button receiving slot extending longitudinally through the bite portion and into the upwardly extending arms of the U-shaped portion to provide opposed upwardly inclined segments including gripping edges in said bite portion adapted to resiliently spread to receive said button head portion in gripping engagement with said head portion, and the distal ends of said U-shaped portion extending toward said support and secured to said structural member.

8. The structural assembly defined in claim 7, characterized in that said structural member includes two spaced slots which wedgingly receive said arms of the U-shaped portion.

9. The structural assembly defined in claim 8, characterized in that said downwardly extending distal ends of the U-shaped portion extend at an acute angle to said arms and include gripping ends which wedgingly engage the opposed walls of said structural member slots.

10. The structural assembly defined in claim 7, characterized in that said arms of the U-shaped portion are received in a downwardly opening slot defined in said structural member, and said downwardly extending distal ends include longitudinally extending ends which are secured to said structural member.

11. The structural assembly defined in claim 7, characterized in that said button includes an upwardly facing conoidal camming surface which resiliently spreads said gripping edges of the bite portion to receive the head portion of the button through said slot.

12. The structural assembly defined in claim 7, characterized in that said bite portion is canted upwardly toward the axis of the slot adjacent the slot to provide gripping edges, and said gripping edges are parallel to permit longitudinal adjustment of the clip on said button.

References Cited

UNITED STATES PATENTS

| 2,103,743 | 12/1937 | Doty | 85—36 |
| 2,187,336 | 1/1940 | Wallschlaeger | 85—36 |
| 2,267,379 | 12/1941 | Tinnerman | 85—36 |
| 2,517,411 | 8/1950 | Patterson | 85—36 |
| 2,535,879 | 12/1950 | Tinnerman | 85—36 |
| 2,798,406 | 7/1957 | Steck | 85—36 |
| 3,038,747 | 6/1962 | Rapata | 85—80 |
| 3,222,838 | 12/1965 | Sweeney | 52—717 |
| 3,246,440 | 4/1966 | Meyer | 52—718 |
| 3,248,995 | 5/1966 | Meyer | 52—718 |
| 3,319,912 | 5/1967 | Crowther | 85—7 |

FOREIGN PATENTS

| 941,247 | 7/1948 | France. |
| 870,168 | 6/1961 | Great Britain. |
| 1,037,840 | 8/1966 | Great Britain. |

MARION PARSONS, JR., Primary Examiner

U.S. Cl. X.R.

24—73; 85—36